United States Patent [19]

Watkins et al.

[11] Patent Number: 5,319,213
[45] Date of Patent: Jun. 7, 1994

[54] THERMAL TARGET TEST BOARD

[75] Inventors: Wendell R. Watkins, El Paso, Tex.; Brent L. Bean, Mesilla Park; Peter D. Munding, Las Cruces, both of N. Mex.

[73] Assignee: The United States of America as represented by the Secretary of the Army, Washington, D.C.

[21] Appl. No.: 863,882

[22] Filed: Apr. 6, 1992

[51] Int. Cl.$^5$ .............................................. G01J 1/00
[52] U.S. Cl. ........................... 250/493.1; 250/495.1; 250/504 R
[58] Field of Search ............. 250/493.1, 495.1, 504 R; 273/348.1

[56] References Cited

U.S. PATENT DOCUMENTS 5,126,577  6/1992  Trent ............................... 250/495.1

OTHER PUBLICATIONS

Watkins W. R. and Jay B. Jordan "Characterization of the Atmospheric Modulation transfer function using the target contrast characterizer" Proceedings of the SPIE International Symposium on Optical Infrared and Millimeter Wave Propagation Engineering vol. 1486, Orlando, Fla., Apr. 1991.

Watkins W. R. "The Target Contrast Characterizer" (U) Army Science Conference Jun. 1988.

Watkins W. R. & J. B. Jordan "Characterization of Turbulence Effects on Infrared Imagery" Proceedings of the SPIE vol. 1486, Orlando, Fla. Apr. 1991.

Kantrowitz F. T., W. R. Watkins, D. R. Billingsley and F. R. Palacios "Characterization and optimization of infrared imager detector response for long path research" Proceedings of the SPIE on characterization Progagation and Simulation of Infrared Scenes, Orlando, Fla. Apr. 1990.

Brent Beam "Mobile Imaging Spectroscopy Laboratory" Final Report Contract No. DAAD07-8-4-C-0008, Las Cruses, N.M. (Sep. 1989).

*Primary Examiner*—Bruce C. Anderson
*Attorney, Agent, or Firm*—Saul Elbaum; Frank J. Dynda

[57] ABSTRACT

A thermal test target with a uniform surface temperature which can be used to characterize and measure thermal image degradation due to atmospheric propagation of the image radiation field. This thermal test target board produces very uniform spatial frequency patterns with near perfect transitions between hot and cold portions which do not change during the diurnal cycle and which are not impacted by environmental changes.

13 Claims, 3 Drawing Sheets

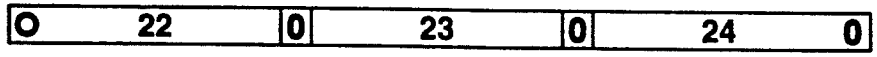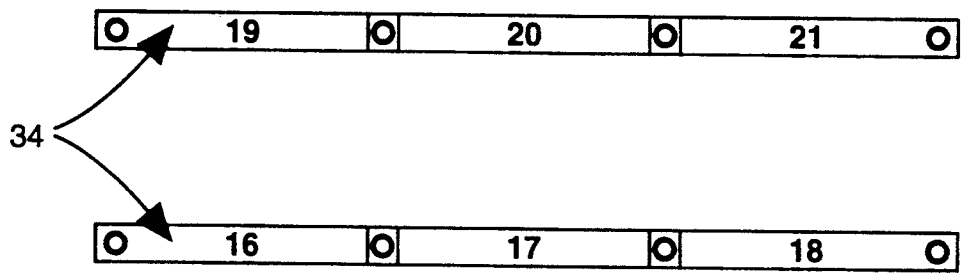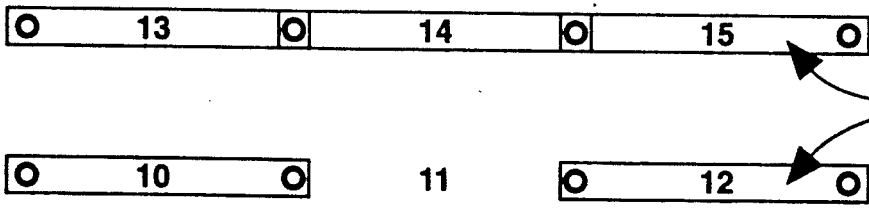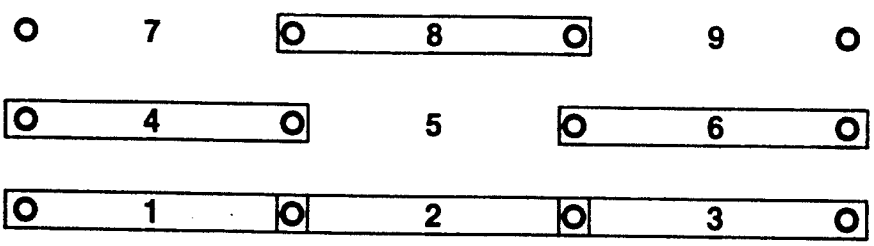
FIG. 2

THERMAL TARGET TEST BOARD

RIGHTS OF THE GOVERNMENT

The invention described herein may be manufactured, used and licensed by or for the United States Government for Governmental purposes without payment to us of any royalty thereon.

BACKGROUND OF THE INVENTION

1. Field of the Invention

The present invention is in the field of thermal (infrared) target simulators used in testing imaging systems.

2. Description of the Prior Art

In order to test thermal target viewers, imagers, and the like, simulators must be used. In addition, a target which can be used to characterize the thermal image degradation due to atmospheric propagation of the image radiation field from close to the target to the thermal image at the imager acquisition range is required. In the area of target acquisition the visible is the most convenient because the human eye has adapted to distinguishing objects by the dominant source of reflected spectral radiation, the sun a 6000 degree K blackbody radiator whose radiation peak is between 0.4 and 0.7 microns. The sun is not always present to illuminate the target and obscurants can prevent the observer from receiving the reflected solar radiation; hence, another spectral region (the 8 to 14 micron, far-infrared, or thermal) is often used to detect targets because ambient temperature radiation from the targets themselves are peaked in the 8 to 14 micron spectral region. In order to assess how well a thermal imaging system will perform for target detection the mechanisms which produce changes in the received thermal image must be quantitatively measured. These mechanisms which produce contrast include: solar radiation which is often variable for partly cloudy conditions, windspeed which cools surfaces convectively or through an evaporative process, precipitation which can rapidly cool warm objects, and a variety of atmospheric obscurants and turbulence which produce attenuation and distortion of the received scene radiation distribution. It is here that the present invention is utilized. The near field/far-field image comparison technique of the Target Contrast Characterizer (described in *The Proceedings of the SPIE International Symposium on Optical, Infrared, and Millimeter Wave Propagation Engineering*, VOL. 926. Orlando, Fla. [1988]) can be used to separate target contrast change components of interest or closeup target contrast changes from the propagation degradation of the inherent contrast to the distant observation location. To properly quantify the propagation degradation a stable thermal spatial target is needed because the inherent signature of a target against a background can change rapidly and even go through periods of no contrast during the thermal reversals of the diurnal cycle. The target board which is the subject of the invention presented herein can be used to produce very uniform spatial frequency patterns with near perfect transistions between hot and cold portions which do not change during the diurnal cycle and which are not impacted by environmental changes. To be useful such a target board must be large (on the order of two meters by two meters), yet lightweight for ease in transporting over rough terrain to typical target locations, and the spatial patterns must be changeable to meet specific target spatial feature characterization requirements. No prior art thermal test target with a uniform surface temperature is known which can be used to characterize and measure thermal image degradation due to atmospheric propagation of the image radiation field. Nothing currently exists which meets these surface temperature uniformity standards requirements. Those target boards which use other methods such as temperature controlled cooling liquids to create uniform surface temperatures weigh several times more than the thermal target test board, which is the subject of this invention.

SUMMARY

This invention is a thermal target test board (TTTB) with a uniform surface temperature which can be used with the Target Contrast Characterizer mentioned above or other thermal imaging systems to characterize the thermal image degradation due to atmospheric propagation of the image radiation field from close to the target to the thermal image representing the target at the imager acquisition range.

The thermal target test board (TTTB) has several features which are essential for its utility. The heated surface must be large on the order of two (2) meters on a side to be of any use at typical one (1) to two (2) kilometer ranges of interest. The heated surface must have a uniform plus or minus one (1) degree centigrade temperature variation over the surface for a 10 to 20 degree centigrade elevated temperature over background temperature. The target board must have ambient temperature bar patterns with variable spatial frequencies which can be used with the heated surface to form near perfect transition between hot and cold bars. The entire thermal target board must be shielded from solar loading and winds to maintain uniformity under changing environmental conditions. Also, the thermal target board must be lightweight for ease in positioning in rough terrain where it is to be used. When used in conjunction with the Target Contrast Characterizer (TCC), the thermal target board (TTTB) was used to measure optical turbulence distortion in thermal imagery which severely impacts the use of aided target recognition systems.

The TTTB was also used to measure contrast transmission with the TCC. Prior to this, attempts to extract contrast transmission values from imagery in the 8 to 12 um region over a 1.5 kilometer path were only within a factor of two in magnitude of predictions. The TTTB can also be used to directly measure the optical transfer function of the imagers in the field environment. The TTTB can be used alone to quantify prevailing atmospheric degradation for a wide range of imager testing and use. The bar pattern is produced by flat white and black panels which can be illuminated by artificial visible light sources in its solar loading shield and provide a day/night visible calibration target pattern in addition to the infrared spectral region.

BRIEF DESCRIPTION OF THE DRAWING

A better understanding of the invention will be obtained when the following detailed description of the invention is considered in connection with the accompanying drawing(s) in which:

FIG. 2 shows the heater arrangement in the thermal oven.

DETAILED DESCRIPTION OF THE INVENTION

Figure 1:
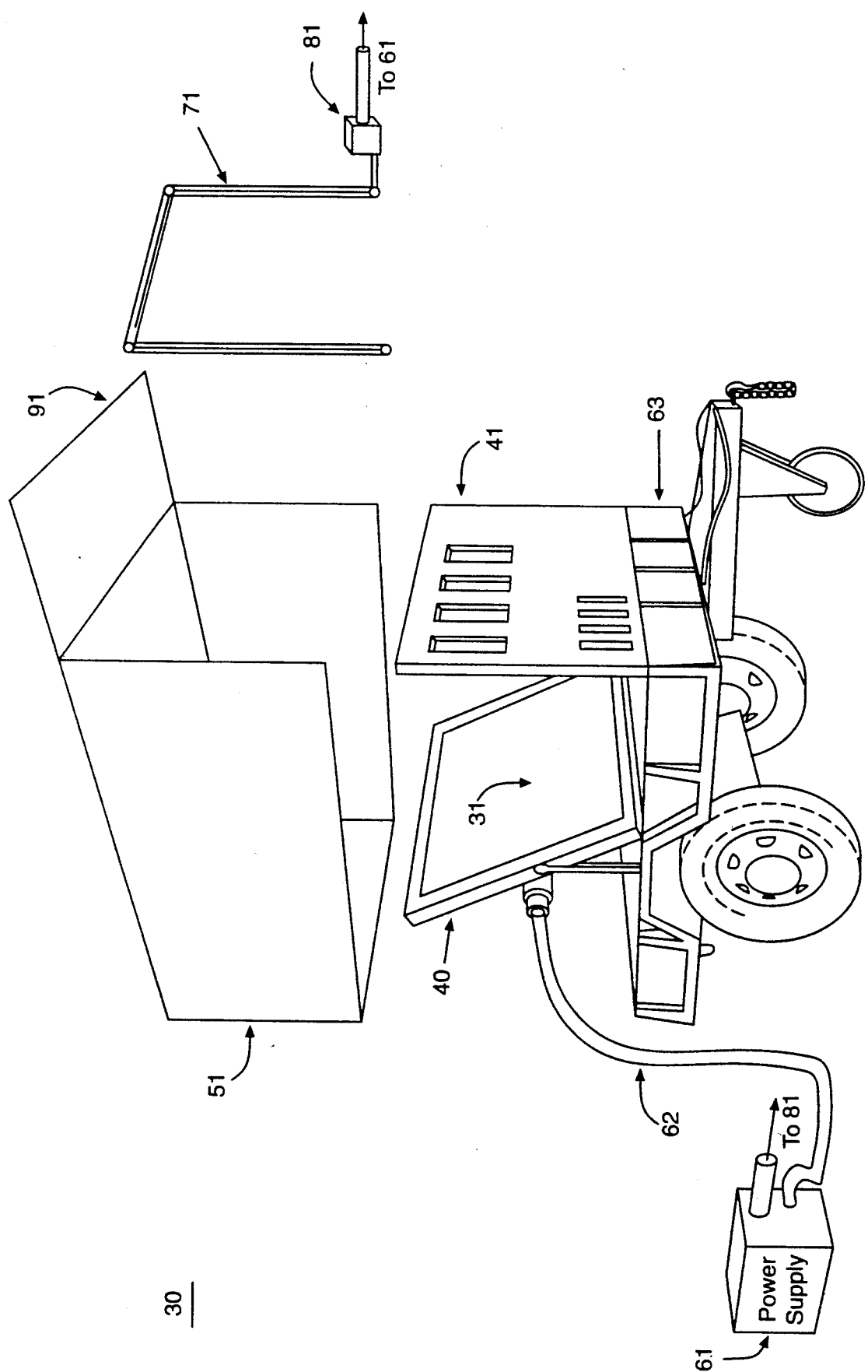
FIG. 1 shows the thermal target test board design.
Figure 3:
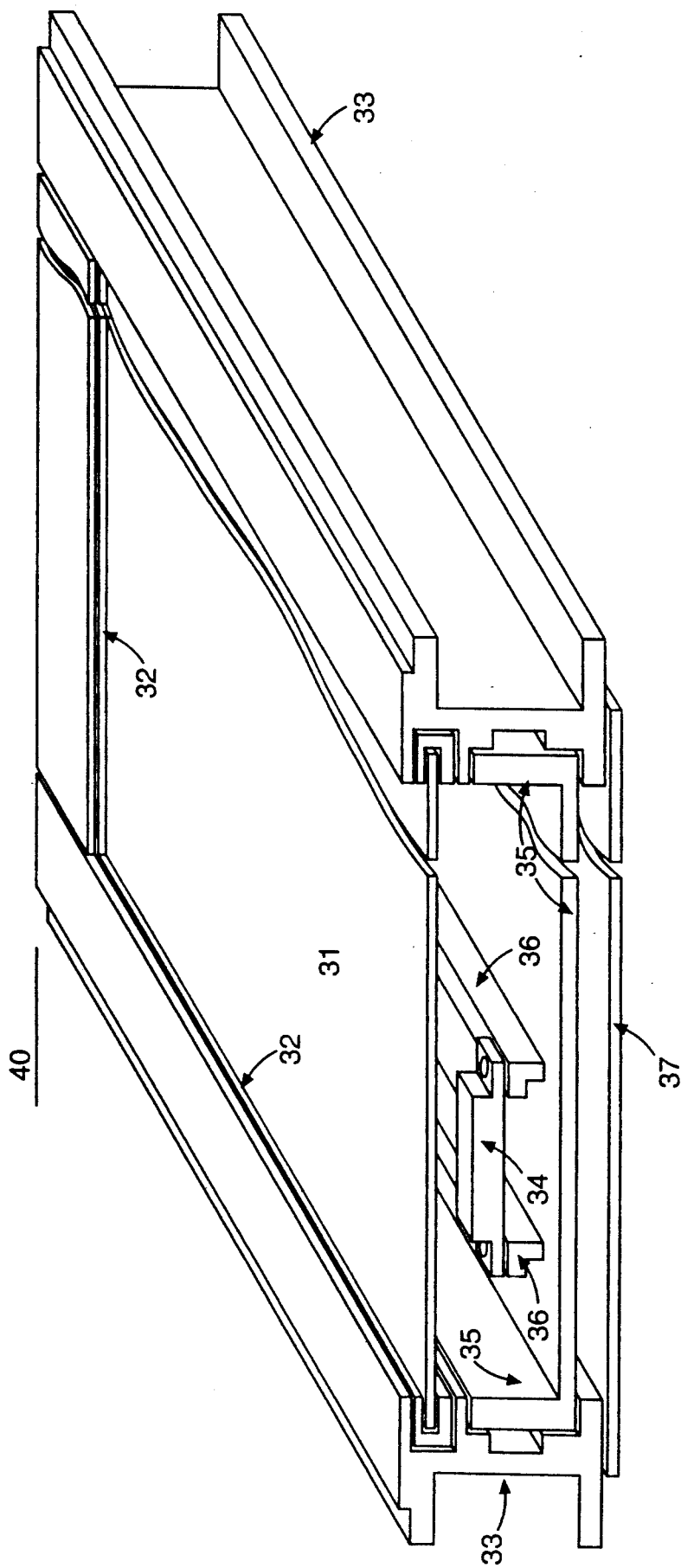
FIG. 3 shows the construction of the thermal oven box.

Referring to FIG. 1 and FIG. 3, the Thermal Target Test Board (TTTB) 30, thermal oven 40, consists of a oven front surface board 31 made of aluminum sheet with a flat black front surface measuring six feet wide and seven feet high. Said front surface board 31 rests on phenolic insulators 32 supported on side aluminum channels 33. The side aluminum channels 33 are used on all four sides of the thermal oven 40 to totally enclose the heaters 34 within the thermal oven 40. FIG. 3 is a cutaway drawing and does not show the bottom and top aluminum side channels 33, which are constructed exactly the same way as the side channels 33 shown. Twenty Chromalox (Trademark) Strip Heaters 34, Model No. SE2450W (240 volt, 250 watt) are supported on four heater support aluminum channels 36, which are welded to side channels 33 at the top and bottom of the thermal oven 40, and placed as shown in FIG. 2, spaced from and beneath the oven front surface board 31. The strip heaters 34 are arranged beneath the oven front surface board 31 in the positions shown in FIG. 2. The positions are numbered individually from one to twenty four, and no heaters are placed in positions 5, 7, 9, and 11 to help create a uniform oven front surface board 31 temperature. Although a variety of heater 34 arrangements are possible, the arrangement shown in FIG. 2 is a preferred arrangement, and when this preferred arrangement is used in conjunction with the tilting of the thermal oven 40, a uniform oven front surface temperature is achieved. In the preferred arrangement, the heaters 34 are arranged in a pattern three columns wide and eight rows in height. The empty spaces at positions 5, 7, 9, and 11 help to eliminate a hot spot on the oven front surface board 31. The row spacing in this arrangement of FIG. 2 increases two inches for every row starting at row four which is spaced six inches above row three, and row eight is spaced sixteen inches above row seven. Row one is located at the bottom of the oven front surface board 31. A panel of foam insulation 35 is placed beneath the heaters 34 and around the inside of the aluminum side channels 33, said foam insulation panel 35 is supported by the side channels 33. A metal oven bottom cover sheet 37 seals the bottom of the thermal oven 40. The thermal oven 40 is tilted at an angle to the vertical, about 30 degrees from vertical, as shown in FIG. 1, to enable the oven front surface board 31 temperature to be uniform.

Referring to FIG. 2, it is seen that a flat white surfaced aperture panel 41 is placed in a vertical position with respect to the flat black toven front surface board 31. When the thermal oven 40 is placed at an angle behind the aperture panel 41, it appears as a square when it is viewed fron in front of the aperture panel 41. The front surface of the aperture panel 41 is flat white and the rear surface of aperture panel 41 is silver colored and faces the flat black oven front surface board 31. A weather shield 51 made of metal and canvas and of a tent like nature covers the aperture panel 41 and the thermal oven 40 to prevent solar loading of the thermal oven 40 and panel 41. The weather shield 51 also protects the thermal oven 40 and aperture panel from wind, precipitation, and other obscurants. The weather shield 51 contains a flap 91 which together with the shape of the roof of the weather shield 51 allows the heat buildup due to the thermal oven 40 to flow out through the front top of said weather shield 51. FIG. 1 shows a blown up view of the Thermal Target Test Board 30. In actual use, the artificial lighting 71 is enclosed within the weather shield 51 which also encloses the aperture panel 41, and the thermal oven 40. In a typical setup a power supply 61 supplies power to the strip heaters 34 mounted in the thermal oven 40. A source of artificial light 71 is utilized within the weather shield 51 to evenly illuminate the aperture panel 41 and the thermal oven 40 to provide day and night visible target calibration. The power supply 61 also supplies power to the source of artificial light 71. Power conversion devices such as flourescent ballasts 81 can be used, as shown in FIG. 1. A trailer 63 is used as a vehicle to mount the Thermal Target Test Board 30. The trailer 63 aids in transporting said Thermal Target Test Board 30 over rough terrain.

Having described this invention, it should be apparent to one skilled in the art that the particular elements of this invention may be changed, without departing from its inventive concept. This invention should not be restricted to its disclosed embodiment but rather should be viewed by the intent and scope of the following claim.

What is claimed is:

1. A thermal target board comprising:
   a rotatable vertical target pattern panel,
   a thermal oven comprising a uniformly heated oven front surface board wherein said front surface board is tilted at an angle with respect to said target pattern panel, and
   wherein said front surface board is sufficiently large to enable infrared field measurements at a distance up to and over 2 kilometers,
   a weather shield protecting said target pattern panel and said thermal oven, wherein said front surface board exhibits a uniform temperature to within ±1 degree centigrade for a 10 to 20 degree centigrade temperature difference above ambient temperature, and further wherein said thermal target board exhibits step-like temperature transitions between said front surface board and said target pattern panel.

2. A thermal target board as in claim 1 wherein said target pattern panel comprises a metal sheet containing a plurality of slots and wherein a front target surface is colored flat white.

3. A thermal target board as in claim 1 wherein said weather shield substantially encloses said target pattern panel and said thermal oven.

4. A thermal target board as in claim 1 wherein said thermal oven comprises:
   said uniformly heated tilted oven front surface board painted flat black,
   a plurality of heaters positioned behind said tilted oven front surface board and arranged so that said heaters are spaced close together at the bottom of said tilted oven front surface board and are spaced further apart at the top of said tilted oven front surface board wherein the heat generated by said heaters flows up against the back of said tilted oven front surface board resulting in uniform heating of said tilted oven front surface board.

5. A thermal target board as in claim 4 comprising:
   a metal box enclosing said plurality of heaters located behind said oven front surface board, and wherein said oven front surface board is thermally insulated from said metal box, and wherein said oven front surface board forms the top of said metal box.

6. The thermal target board as in claim 5 wherein said thermal oven metal box comprises:
- a phenolic insulator supporting and thermally insulating said oven front surface board,
- aluminum side channels forming the sides of said box,
- aluminum heater support channels welded to said aluminum side channels and supporting said heaters,
- an insulation board mounted beneath and around the edges of said plurality of heaters, and
- an aluminum bottom plate forming the bottom of said thermal oven metal box.

7. A thermal target board as in claim 4 comprising said plurality of heaters arranged in a pattern three columns wide and eight rows in height wherein the first and fifth through eight row have three of said heaters each, and wherein the heaters in the second, third, and fourth row are arranged in an X pattern, and further wherein the row spacing increases two inches for every row starting at row four which is spaced six inches above row three, and continuing to row eight which is spaced sixteen inches above row seven, and wherein row one is located substantially at the bottom and behind said oven front surface board.

8. A thermal target board as in claim 1 further comprising:
- a source of artificial light mounted so as to evenly illuminate said target pattern panel and said oven front surface board within said weather shield.

9. A thermal target board as in claim as in claim 8 comprising a power source for said artificial lighting source.

10. A thermal target board as in claim 9 on a wheeled transportable vehicle.

11. The thermal target board as in claim 1 mounted on a transportable wheeled vehicle.

12. A thermal target board as in claim 1 comprising a power source for said thermal oven.

13. A thermal target board as in claim 1 wherein said weather shield allows the heat produced by said thermal oven to flow out through the front top portion of said weather shield.

* * * * *